No. 611,041. Patented Sept. 20, 1898.
A. C. NOE.
COMBINED PLANTER AND FERTILIZER DISTRIBUTER.
(Application filed Mar. 31, 1898.)
(No Model.) 2 Sheets—Sheet 1.
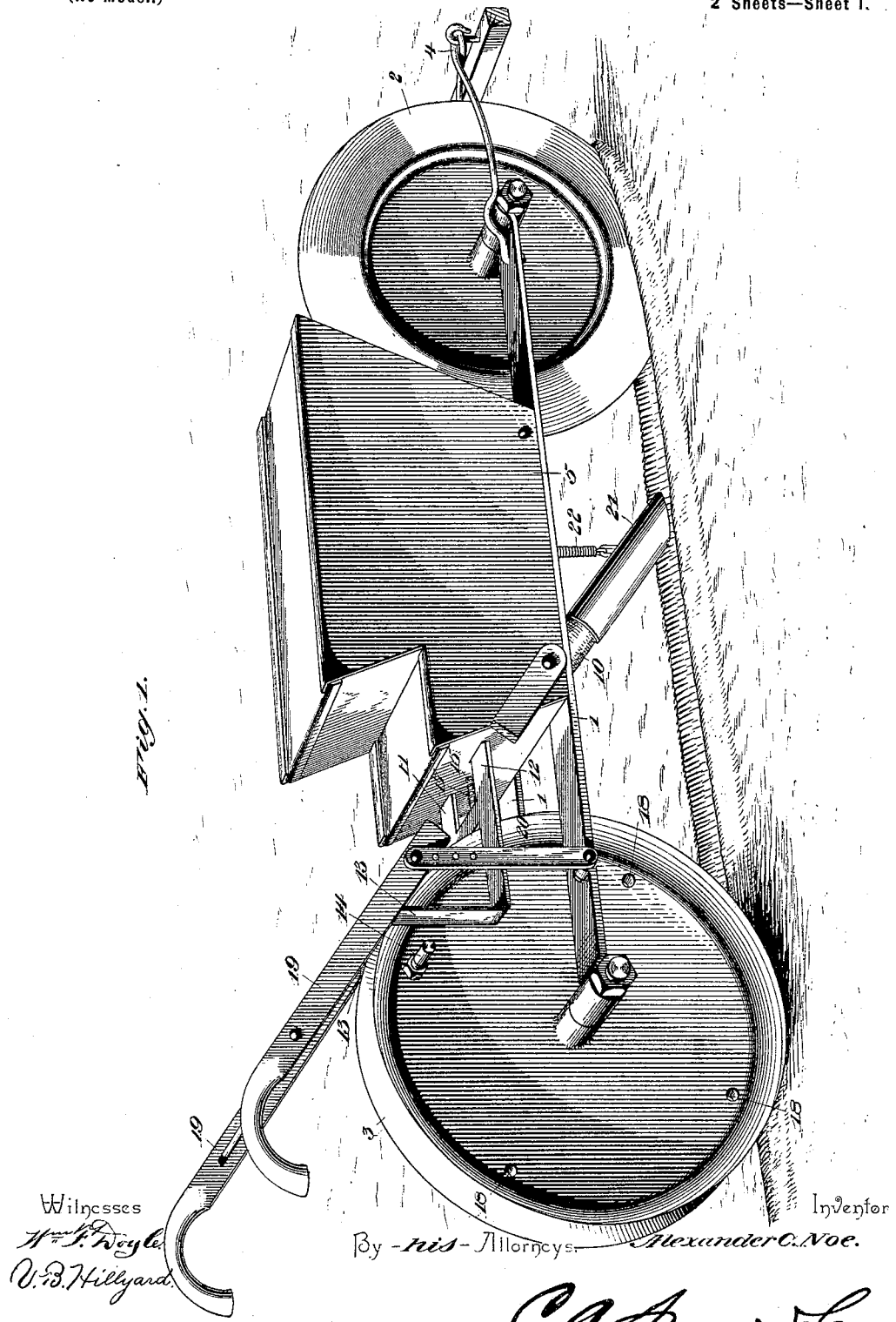

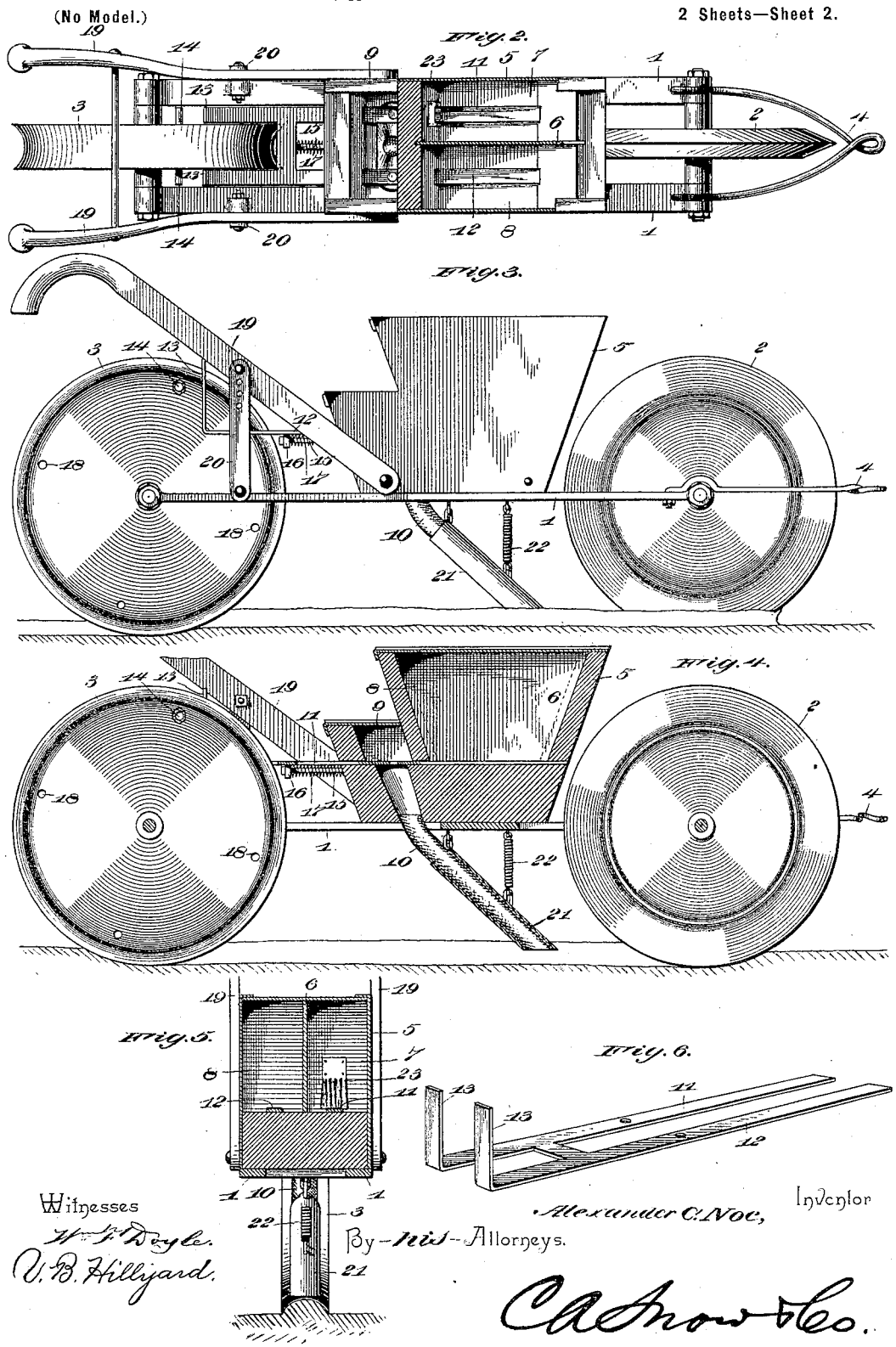

UNITED STATES PATENT OFFICE.

ALEXANDER C. NOE, OF PIKEVIEW, KENTUCKY.

COMBINED PLANTER AND FERTILIZER-DISTRIBUTER.

SPECIFICATION forming part of Letters Patent No. 611,041, dated September 20, 1898.

Application filed March 31, 1898. Serial No. 675,980. (No model.)

*To all whom it may concern:*

Be it known that I, ALEXANDER C. NOE, a citizen of the United States, residing at Pikeview, in the county of Hart and State of Kentucky, have invented a new and useful Combined Planter and Fertilizer-Distributer, of which the following is a specification.

This invention belongs to that class of machinery for sowing seed and fertilizer in drills or check-rows, according to the nature of the required crop, and is designed to devise actuating mechanism of novel construction for simultaneously actuating the slides, whereby the grain and fertilizer are delivered from their respective boxes or compartments into the grain tube or spout, which conveys them to the trench or furrow.

Another purpose of the invention is to dispose a compartment adjacent to the seedbox or hopper so as to receive the charges of seed and fertilizer, which are commingled before their entrance into the seed-tube, thereby insuring the proper feeding of the seed when germinated.

With these ends in view the invention consists in the novel combination of elements and in the construction and arrangement of parts, as hereinafter described and claimed.

To enable others to understand the invention, I have illustrated a preferred embodiment thereof in the accompanying drawings, forming a part of this specification, and in which—

Figure 1 is a perspective view of a planter embodying the features of this invention. Fig. 2 is a top plan view thereof, the covers of the hopper and mixing compartment being omitted and the upper portion of the rear wall of the hopper being broken away. Fig. 3 is a side elevation. Fig. 4 is a longitudinal section. Fig. 5 is a transverse section of the hopper, showing the manner of connecting the grain-spout therewith. Fig. 6 is a detail view in perspective of the double slide.

Corresponding and like parts are referred to in the following description and indicated in the several views of the drawings by the same reference characters.

The frame comprises longitudinal bars 1, supported upon wheels 2 and 3, the front wheel 2 being sharpened and serving as an opener and the rear wheel having its tread portion hollow or made concaved to act as a coverer, the two wheels alining, so as to track. A V-shaped bail 4 is attached to the front ends of the longitudinal bars 1, and the draft is hitched thereto.

The hopper or seedbox 5 is subdivided by a longitudinal partition 6 into two compartments, the compartment 7 receiving the seed and the compartment 8 containing the fertilizer. The discharge-openings are formed in the rear wall of the hopper and lead into a compartment 9 in the rear of the hopper and in which the seed and fertilizer intermix. The grain-spout 10 communicates at its upper end with a discharge-opening in the bottom of the mixing-compartment 9. The slides 11 and 12 are similarly formed and are provided with openings or pockets which are adapted to be brought into register with the hopper and the mixing-compartment when the planter is in operation. These slides operate over the bottom of the hopper and through openings in the front and rear walls of the hopper and mixing-compartment. The rear ends of the slides are bent vertically, as shown at 13, and come upon opposite sides of the rear or covering wheel 3, so as to be struck by a pin or tappet 14, applied to the wheel 3. A rod 15 is secured at its front end to the rear wall of the mixing-compartment and passes through an eye 16, applied to the under side of a cross-piece connecting the slides, and upon this rod is mounted a spring 17, which is confined between the rear wall of the mixing-compartment and the eye 16 and serves to hold the slides at the limit of their rearward stroke.

The covering-wheel 3 is provided with a series of openings 18, in which are fitted one or more pins or tappets 14, according to the distance apart at which it is required to plant the seed. If only one pin or tappet is employed, the seed will be planted in check-rows the maximum distance apart. By employing two pins or tappets and locating them at diametrically opposite points the seed will be planted at half the distance apart as compared with the planting when only one pin is used. By having recourse to a number of pins or tappets the seed may be planted at any required distance apart and in check-rows or drills, as desired.

In the preferable construction the slides 11 and 12 are formed of a single piece of sheet metal, and by having their rear ends coming upon opposite sides of the wheel 3 the strain is equalized, inasmuch as the pin may be set to project from both sides of the wheel, thereby striking the bent ends 13 simultaneously. This construction obviates any binding of the slides in the openings in which they reciprocate and causes the wheel 3 to run steady and be free from side stress. The handles 19 are secured at their lower ends to the sides of the mixing-compartment and are supported by braces 20, which have adjustable connection therewith, so as to admit of the rear ends of the handles being raised or lowered to suit the operator. The grain-spout 10 is a flexible tube and is protected at its lower end by a boot 21, of metal, said boot having pivotal connection at its upper end with the bottom of the hopper, and a spring 22, connecting the lower portion of the boot with the hopper, so as to admit of the boot yielding when meeting with an obstruction, and yet serving to hold it in proper position. The hopper and the mixing-compartment are each closed by a cover, the latter sliding in suitable ways. A brush 23 is applied to the rear wall of the seed-compartment 7 and operates over the slide 12 to prevent a too great quantity of seed being delivered into the mixing-compartment.

In practice the seed to be sown is placed in the compartment 7, and the fertilizer to be distributed is contained in the compartment 8. As the planter is drawn over the field a trench is formed by the front wheel 2, and the grain and fertilizer are delivered into the trench by means of the grain-spout, the seed being covered by the wheel 3. The required quantity of seed and fertilizer is supplied to the mixing-compartment by the respective slides, and the seed and fertilizer are mixed in such compartment prior to their entrance into the grain-spout. The distance between the slides 11 and 12 may be varied, according to the size and style of planter, so as to bring them as close to or as far away from the partition 6 as may be desired.

It is evident that the machine is susceptible of various changes in the form, proportion, and minor details of construction without departing from the principle of the invention.

Having thus described the invention, what is claimed as new, and desired to be secured by Letters Patent, is—

1. In a combined planter and fertilizer-distributer, the combination of separate compartments for receiving grain and fertilizer respectively, a mixing-compartment, means for simultaneously conveying a charge of grain and fertilizer from the first-mentioned compartments into the mixing-compartment, and a grain-spout in communication with the mixing-compartment for conveying the contents therefrom to the furrow, substantially as set forth.

2. In a combined planter and fertilizer-distributer, the combination of juxtaposed compartments for receiving grain and fertilizer respectively, a mixing-compartment, and slides operating through the mixing-compartment and the fertilizer and grain compartments for simultaneously delivering a charge of grain and fertilizer from their respective compartments into the mixing-compartment, substantially as set forth.

3. In a combined planter and fertilizer-distributer, the combination of a hopper subdivided by a longitudinal partition into compartments for receiving grain and fertilizer respectively, a mixing-compartment in the rear of the hopper and having communication with the fertilizer and grain compartments, a grain-spout having communication with the lower portion of the mixing-compartment, and connected slides operating through openings in the walls of the hopper and mixing-compartment and adapted to simultaneously deliver a charge of grain and fertilizer from their respective compartments into the mixing-compartment, substantially as specified.

4. In a planter, the combination with a hopper subdivided into compartments, a pair of slides operating in the hopper and connected to operate simultaneously and having their outer ends bent vertically and spaced apart, a spring normally tending to move the slides outwardly, and a tappet-wheel operating in the space formed between the outer bent ends of the slides and adapted to have its tappets engage with the bent terminals of the slides, as and for the purpose set forth.

5. A combined planter and fertilizer-distributer, comprising a frame mounted upon a furrow-opening wheel and a covering-wheel, a hopper comprising a fertilizer and a grain compartment, a mixing-compartment in the rear of the hopper, connected slides operating through openings in the walls of the hopper and mixing-compartment and having their rear ends coming upon opposite sides of the covering-wheel, a rod having a spring to move the slides rearwardly, and a grain-spout having connection with the mixing-compartment, substantially as set forth.

In testimony that I claim the foregoing as my own I have hereto affixed my signature in the presence of two witnesses.

ALEXANDER C. NOE.

Witnesses:
L. B. HANDLEY,
W. W. WILLIAMS.